United States Patent
Kaley et al.

(10) Patent No.: US 9,138,089 B1
(45) Date of Patent: Sep. 22, 2015

(54) BUTTERING DEVICE

(71) Applicants: Robert C. Kaley, Landisville, PA (US);
Nancy G. Kaley, Landisville, PA (US);
David F. Wolf, Lancaster, PA (US);
Patricia A. Wolf, Lancaster, PA (US)

(72) Inventors: Robert C. Kaley, Landisville, PA (US);
Nancy G. Kaley, Landisville, PA (US);
David F. Wolf, Lancaster, PA (US);
Patricia A. Wolf, Lancaster, PA (US)

( * ) Notice: Subject to any disclaimer, the term of this patent is extended or adjusted under 35 U.S.C. 154(b) by 0 days.

(21) Appl. No.: 14/550,212

(22) Filed: Nov. 21, 2014

Related U.S. Application Data

(60) Provisional application No. 61/976,531, filed on Apr. 8, 2014.

(51) Int. Cl.
*A47G 19/00* (2006.01)
*A47J 9/00* (2006.01)
*A47J 43/28* (2006.01)

(52) U.S. Cl.
CPC .............. *A47G 19/303* (2013.01); *A47J 9/001* (2013.01); *A47J 43/28* (2013.01)

(58) Field of Classification Search
CPC .......... A47G 19/303; A47J 9/00; A47J 9/001; A47J 43/28
USPC .................... 401/9, 11, 12; D7/647, 670, 692
See application file for complete search history.

(56) References Cited

U.S. PATENT DOCUMENTS

| | | | |
|---|---|---|---|
| 2,527,149 A | | 7/1946 | Peterson |
| 2,691,877 A | | 8/1952 | Frolich |
| 2,690,657 A | * | 10/1954 | Milewski ........................ 401/12 |
| D178,487 S | * | 8/1956 | Becker .......................... D7/670 |
| 2,811,844 A | | 11/1957 | Selmer |
| 3,652,171 A | * | 3/1972 | Carlson ......................... 401/12 |
| 4,408,919 A | | 10/1983 | Wolff et al. |
| D272,796 S | | 2/1984 | Wolff |
| D296,646 S | | 7/1988 | Yoder |
| D478,483 S | | 8/2003 | Kotsonis |
| 7,150,574 B1 | | 12/2006 | Cerqua |

* cited by examiner

*Primary Examiner* — David Walczak
*Assistant Examiner* — Bradley Oliver
(74) *Attorney, Agent, or Firm* — Hooker & Habib, P.C.

(57) ABSTRACT

A buttering device for coating the outside of hot vegetables with butter or similar coating includes a hollow receptacle to hold the butter that has the shape of a truncated wedge. The receptacle has a relatively narrow discharge opening and a relatively wide supply opening.

17 Claims, 3 Drawing Sheets

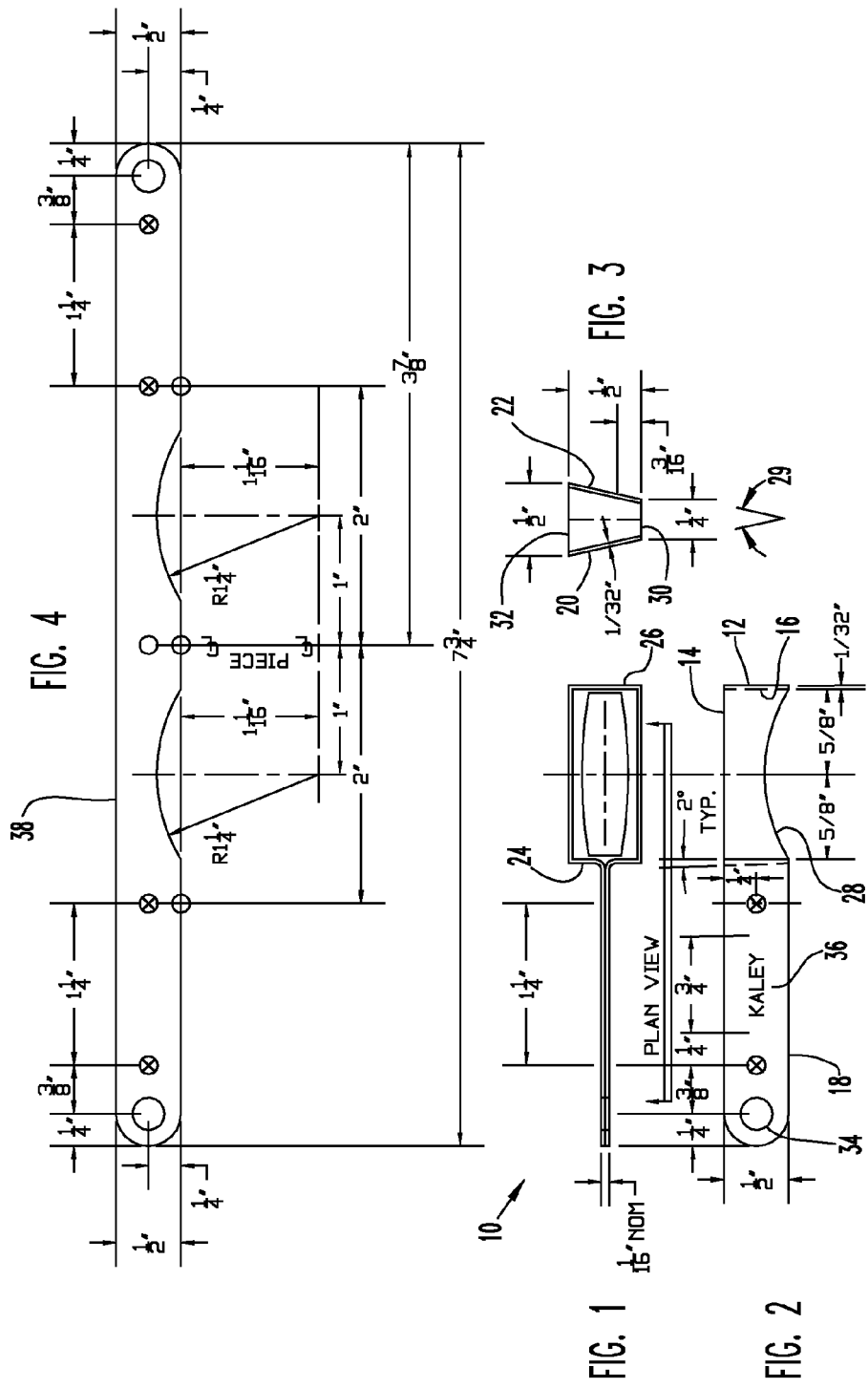

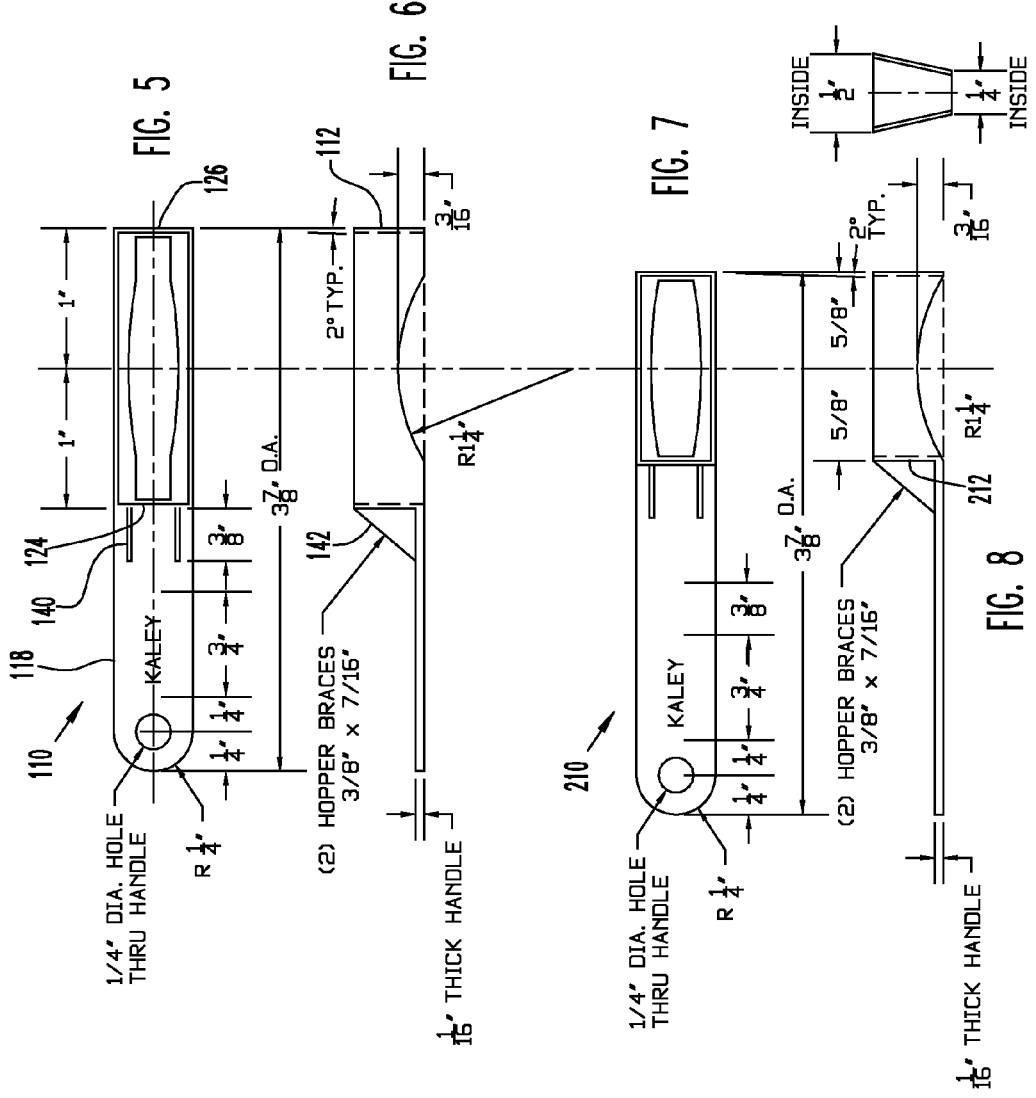

BUTTERING DEVICE

This application claims priority from our U.S. Provisional Patent Application No. 61/976,531 for "Cob Buttering Device" filed Apr. 8, 2014, which priority application is incorporated by reference as if fully set forth herein.

FIELD OF THE DISCLOSURE

The disclosure relates to devices for buttering corn or other vegetables.

BACKGROUND OF THE DISCLOSURE

Buttering devices are typically used to apply a coating of butter or similar product to the outside of corn on the cob.

SUMMARY OF THE DISCLOSURE

Disclosed is a buttering device for buttering corn on the cob that can also efficiently butter the outside of other vegetables such as zucchini or summer squash.

An embodiment of the buttering device includes a hollow receptacle having open upper and lower ends and a handle attached to and extending away from the receptacle. The lower end of the receptacle is placed against the vegetable while buttering.

The receptacle is formed by a pair of spaced-apart side walls and a pair of spaced-apart end walls joining the side walls. Each side wall has a concave lower edge at the lower side of the receptacle. The pair of side walls are inclined towards each other from the upper side of the receptacle towards the lower side of the receptacle.

The inclined side walls form a receptacle having a truncated wedge shape in which the receptacle discharge opening at the lower side of the receptacle is narrower than the receptacle supply opening at the upper side of the receptacle.

The relatively narrow bottom opening enables the buttering device to better conform to changes in outer curvature of the corn cob or other vegetable along the length of the vegetable.

The truncated wedge shape enables the receptacle to hold sufficient butter for convenient use before going dry while reducing the amount of wasted butter capable of being left in the receptacle after use.

In an embodiment, the bottom opening has a width of about one-quarter inch. The narrow opening allows the receptacle to be filled with butter without the butter falling out of the receptacle during buttering. Thus there is no need for a screen, filaments, or other retaining structure across the bottom opening to hold the butter in the receptacle. Such bottom retaining structures can impede melting of the butter during use, and can obstruct the discharge of melted butter from the buttering device (and sometimes require use of a tamper to force the butter through the device). Eliminating these structures enables more efficient melting and flow of butter during use, eliminates the need for a tamper, and also making cleanup easier and faster without the need to clean screens, filaments, or the like.

The narrow bottom opening also enables the heat of the vegetable to more efficiently melt the butter at the bottom opening while buttering, allowing the vegetable to be buttered in less time.

In possible embodiments, the buttering device is formed as a one-piece integral member of metal or plastic. There are no other parts that can be lost or broken that would impair use of the device.

In other possible embodiments, the side walls of the receptacle are inclined at an angle of about thirty degrees with respect to each other. This allows for a relatively narrow bottom opening while still providing a wider upper opening for easy filling of the receptacle with butter, the ability to check the butter level in the receptacle at a glance, and sufficient butter capacity for buttering one or two corn cobs.

In yet other possible embodiments, the handle includes a through-hole that enables the buttering device to be placed on a keychain to take along to a picnic or other outing. The truncated wedge-shaped receptacle is relatively compact and lightweight, enabling the buttering device to be placed in a pocket or purse to be taken anywhere.

Other objects and features of the disclosure will become apparent as the description proceeds, especially when taken in conjunction with the accompanying drawing sheets illustrating one or more non-limiting embodiments.

BRIEF DESCRIPTION OF THE DRAWINGS

FIG. 1 is a top view of a first embodiment buttering device;

FIG. 2 is a plan view of the buttering device shown in FIG. 1;

FIG. 3 is an end view of the buttering device shown in FIG. 1;

FIG. 4 is a view of a metal plate used in forming the buttering device shown in FIG. 1;

FIG. 5 is a top view of a second embodiment buttering device;

FIG. 6 is a plan view of the buttering device shown in FIG. 5;

FIG. 7 is a top view of a third embodiment buttering device;

FIG. 8 is a plan view of the buttering device shown in FIG. 7;

FIG. 9 is an end view of the buttering device shown in FIG. 7; and

DETAILED DESCRIPTION OF ONE OR MORE EMBODIMENTS

Figure 10:
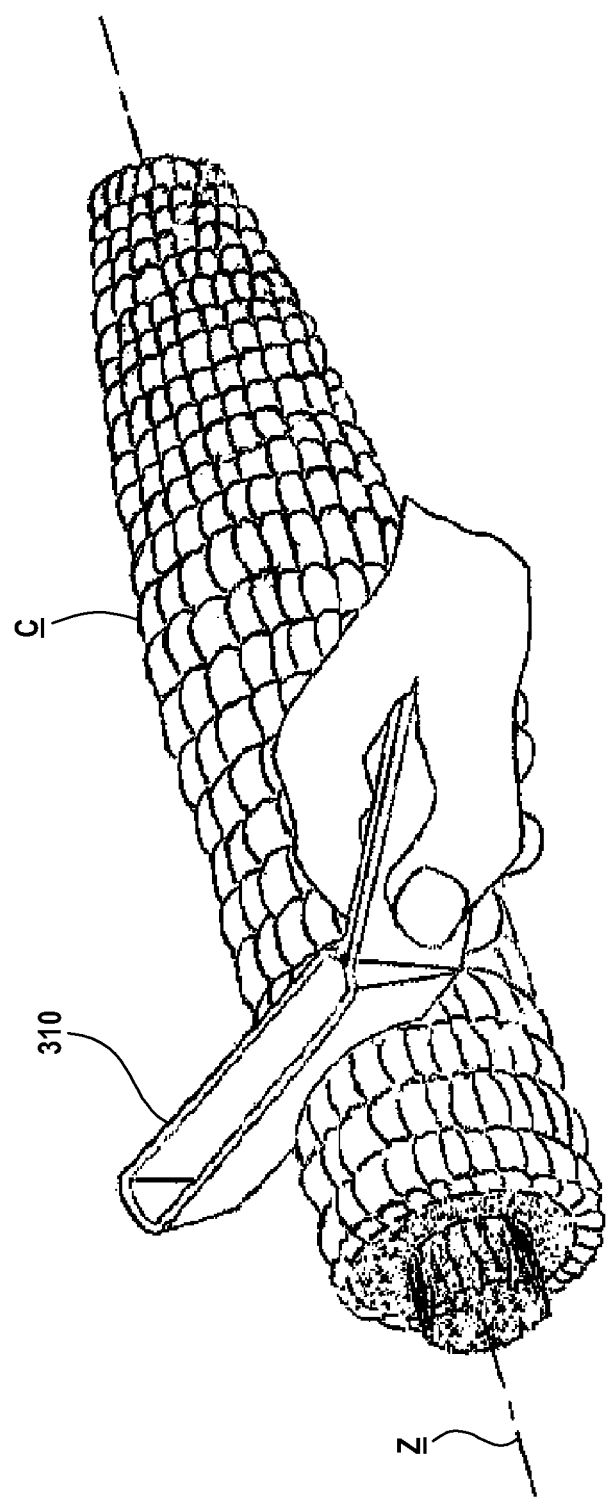
FIG. 10 illustrates use of a buttering device similar to the buttering device shown in FIG. 1.

FIGS. 1-3 illustrate a first embodiment buttering device 10. The device 10 is formed from the single length of aluminum strip or plate shown in FIG. 4.

The buttering device 10 includes a hopper or hollow receptacle 12 having open upper and lower sides 14, 16 and a handle 18 attached to and extending away from the receptacle 12. The lower receptacle side 16 is placed against the vegetable while buttering.

The illustrated receptacle 12 is formed by a pair of spaced-apart, substantially planar side walls 20, 22 and a pair of spaced-apart substantially planar end walls 24, 26 joining the side walls. Each side wall 20, 22 has a concave lower edge 28 at the lower side of the receptacle.

The pair of side walls 20, 22 are inclined towards each other from the upper side of the receptacle towards the lower side of the receptacle. The illustrated side walls 20, 22 are inclined at an angle 29 of about 30 degrees with respect to each other, that is, the two side walls 20, 22 define an included angle or triangle apex angle 29, the included 29 being about 30 degrees. The end walls 24, 26 are generally parallel with each other and are generally perpendicular to the side walls 20, 22. The end walls 24, 26 may be slightly non-parallel for ease of manufacture (to ease removal from an injection mold, for example).

The receptacle 12 can be seen to have a truncated wedge shape in which the lower receptacle opening 30 is narrower than the upper receptacle opening 32. The wedge is truncated (that is, the inclined sides of the wedge do not intersect with one another) to define the discharge opening 30. Both the discharge opening 30 and the supply opening 32 are completely open and unobstructed. The receptacle 12 has a generally rectangular cross section that decreases in area from the upper side of the receptacle to the lower side of the receptacle.

As can be best seen in FIG. 3, the narrow end of the truncated wedge has a width of about one-quarter inch. That is, the side walls 20, 22 are spaced apart from each other about one-quarter inch at the lower side of the receptacle. The side walls 20, 22 are spaced apart from each other about one-half inch at the upper side of the receptacle. The receptacle has a height between upper and lower sides of about one-half inch and has a length between the end walls 24, 26 of about one-and-one-quarter inches.

The handle 18 extends from the end wall 24 and away from the receptacle 12. A through-hole 34 extends through the handle 12 away from the end wall 24 for receiving a keychain or storage hook. The handle provides room for a branding area 36 for applying a trademark, ornamental design, or the like. The illustrated handle 14 is a straight handle that extends the full height of the end wall 24. In other possible embodiments the handle 14 can be a curved handle or have some other shape or orientation.

The buttering device 10 is formed as a one-piece integral body formed from the flat aluminum strip or plate 38 shown in FIG. 4. The strip 38 is bent to shape and then spot welded or otherwise fastened together to form a rigid one-piece buttering device 10.

FIGS. 5 and 6 illustrate a second embodiment buttering device 110 that is similar to the buttering device 10 and so only differences will be discussed. The buttering device 110 is formed as a one-piece integral plastic member. The receptacle 112 is similar to the receptacle 12 but is longer, with the end walls 124, 126 spaced about two inches from each other. The handle 118 is located adjacent the lower side of the receptacle 112 and extends the width of the end wall 124. A pair of braces or stiffening gussets 140, 142 interconnect the receptacle 112 and the handle 118 and resist bending of the handle.

FIGS. 7-9 illustrate a third embodiment buttering device 210 that is similar to the buttering device 110 but with the receptacle 212 similar in shape to the receptacle 12.

FIG. 10 illustrates a buttering device 310 similar to the device 10 and configured for buttering corn. The buttering device 310 is shown buttering corn on the cob C (for clarity, the butter is not included in the figure). The lower concave edges of the side walls are configured to closely fit the outer curvature of a cob; as shown in FIG. 10 the concave edges have a radius of curvature of about one-and-one-quarter inches and closely receive the largest cob radius when the device 10 is oriented perpendicular to the cob axis Z.

The receptacle is filled with butter and the lower side of the receptacle device is placed against the hot cob and the device is moved along the cob for buttering the cob. The heat from the cob melts the butter adjacent the lower receptacle opening, the melted butter flowing out of the opening and coating the corn.

The outer radius of corn on the cob typically gets smaller moving from one end of the cob to the other. The outer radius of the illustrated cob C decreases moving to the right along the axis Z as shown in FIG. 10.

As the buttering device 310 is moved to the right, the buttering device 310 can be oriented away from perpendicular with the cob axis to enable the lower concave edges of the side walls to better conform with the outer surface of the cob. Because the buttering device 310 has a relatively narrow bottom opening—which, as shown in FIG. 10 may be narrower in width than the axial width of an ear of corn on the cob—the buttering device 310 can closely conform to the outer surface of the cob essentially along the entire length of the cob.

The relatively narrow width of the discharge slot of the buttering device also makes the buttering device practical for coating the outer surfaces of other vegetables that typically have a smaller outer radius than a corn cob, or have more variation in outer radius along the length of the vegetable. The buttering device can be readily oriented to maintain close proximity of the discharge opening with the outer surface of the vegetable.

The volume of the receptacle 12 can be varied by varying the height of the receptacle, varying the included angle 29, or by varying the length of the receptacle (the distance between the end walls 24, 26. To reduce waste, the buttering device embodiment shown in FIGS. 1-3 has a receptacle sized to hold sufficient butter for coating one or two corn cobs.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art and fall within the purview of the following claims.

What is claimed is:

1. A buttering device comprising:
   a pair of opposing side walls and a pair of opposing end walls joining the side walls, the side walls and the end walls being generally planar and defining a hollow receptacle having an interior bounded only by the side walls and the end walls;
   the receptacle having an open upper side and an open lower side, the lower side spaced from the upper side in a longitudinal direction of the receptacle, each side wall having a concave lower edge at the lower side of the receptacle;
   each side wall having an inner surface facing the interior of the receptacle and an opposite outer surface;
   each end wall having an inner surface facing the interior of the receptacle and an opposite outer surface;
   the pair of side walls inclined towards each other from the upper side of the receptacle towards the lower side of the receptacle;
   an elongate handle attached to and extending away from the receptacle, the handle extending from the receptacle along an axis transverse to the longitudinal direction of the receptacle; and
   wherein apart from the handle, the outer surfaces of the end walls and the outer surfaces of the side walls also define outermost surfaces of the buttering device.

2. The buttering device of claim 1 wherein the receptacle has the shape of a truncated wedge.

3. The buttering device of claim 1 wherein the side walls are spaced apart from each other about one-quarter inch at the lower side of the receptacle.

4. The buttering device of claim 1 wherein the side walls are spaced apart from each other about one-half inch at the upper side of the receptacle.

5. The buttering device of claim 1 wherein the end walls are spaced apart from each other not greater than about two inches and not less than about one-and-one-quarter inches.

6. The buttering device of claim 1 wherein the end walls are parallel with one another.

7. The buttering device of claim 1 wherein the side walls are generally planar and substantially perpendicular to the end walls.

8. The buttering device of claim 1 formed as an integral, one-piece metal member.

9. The buttering device of claim 8 wherein the buttering device is formed of aluminum.

10. The buttering device of claim 1 formed as an integral, one-piece plastic member.

11. The buttering device of claim 1 wherein the lower end of the receptacle has an unobstructed opening.

12. The buttering device of claim 1 wherein the side walls are disposed at an included angle of about 30 degrees.

13. The buttering device of claim 1 wherein the handle includes a through-hole spaced away from the receptacle.

14. The buttering device of claim 1 wherein the handle extends from one of the end walls and the buttering device comprises one or more gussets interconnecting the handle and the one end wall.

15. The buttering device of claim 1 wherein the side walls are spaced apart one-half inch at the upper side of the receptacle and are spaced apart one-quarter inch at the lower side of the receptacle, the upper side of the receptacle is spaced from the lower side of the receptacle by one-half inch, and the side walls define an apex angle of about 30 degrees.

16. The buttering device of claim 1 wherein the receptacle has a rectangular cross section that decreases in area from the upper side of the receptacle towards the lower side of the receptacle.

17. The buttering device of claim 16 wherein the receptacle has a non-square cross section, the side walls being closer together to one another than are the end walls.

\* \* \* \* \*